US012620887B2

(12) United States Patent
Yu et al.

(10) Patent No.: US 12,620,887 B2
(45) Date of Patent: May 5, 2026

(54) HIGH EFFICIENCY SWITCHING CONVERTER AND CONVERSION CONTROL CIRCUIT AND METHOD THEREOF

(71) Applicant: Richtek Technology Corporation, Hsinchu (TW)

(72) Inventors: Chun-Jen Yu, Taoyuan (TW); Chi-Jen Yang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 324 days.

(21) Appl. No.: 18/488,000

(22) Filed: Oct. 16, 2023

(65) Prior Publication Data

US 2024/0305186 A1    Sep. 12, 2024

(30) Foreign Application Priority Data

Mar. 9, 2023    (TW) .................................. 112108808

(51) Int. Cl.
    *H02M 3/158*        (2006.01)
    *H02M 1/00*         (2006.01)
    *H02M 1/088*        (2006.01)

(52) U.S. Cl.
    CPC ......... *H02M 1/088* (2013.01); *H02M 1/0009* (2021.05); *H02M 1/0025* (2021.05); *H02M 3/158* (2013.01)

(58) Field of Classification Search
    CPC .... H02M 1/088; H02M 1/083; H02M 1/0845; H02M 1/096; H02M 1/0009; H02M 1/0003; H02M 1/0025; H02M 3/158; H02M 3/156; H02M 3/1566; H02M 3/157

See application file for complete search history.

(56) References Cited

U.S. PATENT DOCUMENTS

2016/0204704 A1 *  7/2016  Cao ........................ H02M 3/156
                                                        323/271
2022/0416666 A1 * 12/2022  Kawano .............. H02M 3/1588

* cited by examiner

*Primary Examiner* — Nguyen Tran
(74) *Attorney, Agent, or Firm* — Huan-Yi Lin

(57)    ABSTRACT

A switching converter includes: a power stage circuit which includes at least one switch to switch an inductor to convert an input power to an output power; a first loop control circuit configured to switch the at least one switch by a peak current mode according to a first feedback signal related to the output power and an inductor current of the inductor in a first control mode; and a second loop control circuit configured to control the at least one switch to switch with a switching period according to a second feedback signal in a second control mode. If the power stage circuit operates in DCM during consecutively more than a predetermined number of the switching periods, the switching converter enters the first control mode. A portion of sub-circuits of the second loop control circuit are turned off to reduce power consumption in the first control mode.

26 Claims, 15 Drawing Sheets

HIGH EFFICIENCY SWITCHING CONVERTER AND CONVERSION CONTROL CIRCUIT AND METHOD THEREOF

CROSS REFERENCE

The present invention claims priority to TW 112108808 filed on Mar. 9, 2023.

BACKGROUND OF THE INVENTION

Field of Invention

The present invention relates to a switching converter; particularly, it relates to such switching converter having a relatively high conversion efficiency and is more power-saving. The present invention also relates to a conversion control circuit and a conversion control method, both of which are configured to control such switching converter.

Description of Related Art

Please refer to FIG. 1, which shows a schematic diagram of a conventional switching converter (i.e., conventional switching converter 900). As shown in FIG. 1, the conventional switching converter 900 converts an input power Vin to an output power Vout by switching an inductor L1, wherein the resultant output power Vout is supplied to a load. A feedback circuit 93 generates a feedback signal VF according to the output power Vout. A control circuit 92 generates a modulation signal PWM according to the feedback signal VF. A driver circuit 91 generates a driving signal S1 and a driving signal S2 in accordance with the modulation signal PWM, wherein the driving signal S1 and the driving signal S2 are configured to control a switch M1 and a switch M2, respectively, to switch the inductor L1.

The prior art shown in FIG. 1 has the following drawbacks that: when a load condition is extremely light, the conventional switching converter 900 has no option but still enters a discontinuous conduction mode (DCM) having a constant ON time. Consequently and undesirably, in this case, an error amplifier, a comparator and the feedback circuit 93 in the control circuit 92 remain in the relatively greater power consumption state, which causes lower conversion efficiency.

SUMMARY OF THE INVENTION

From one perspective, the present invention provides a switching converter, which is configured to operably convert an input power to an output power; the switching converter comprising: a power stage circuit which includes at least one switch, wherein the power stage circuit is configured to operably switch an inductor, so as to convert the input power to the output power; a first loop control circuit, which is configured to operably control switching of the at least one switch by a peak current mode according to a first feedback signal related to the output power and an inductor current of the inductor in a first control mode, so as to regulate an electric characteristic at a predetermined level, wherein in the peak current mode, a peak of the inductor current corresponds to a peak current level; and a second loop control circuit, which is configured to operably control the at least one switch to switch with a switching period according to a second feedback signal related to the output power in a second control mode; wherein when the power stage circuit operates in a discontinuous conduction mode (DCM) for consecutively more than a first predetermined number of the switching periods, the switching converter enters the first control mode, wherein the DCM indicates that: within the switching period, the inductor current flowing through the inductor is reduced to zero until a starting time point of a next switching period, wherein in the first control mode, power supplies for a portion of sub-circuits of the second loop control circuit are turned off, so as to reduce power consumption.

In one embodiment, a level of a load current of the switching converter is relatively lower in the first control mode and is relatively higher in the second control mode.

In one embodiment, in the first control mode, among a second predetermined number of the switching periods, when a number of the switching periods in which the power stage circuit operates in the DCM is smaller than a third predetermined number, the switching converter enters the second control mode.

In one embodiment, in the first control mode, when a voltage difference between an input voltage of the input power and an output voltage of the output power is smaller than a predetermined difference, the switching converter enters a light-load constant ON mode, wherein in the light-load constant ON mode, the first loop control circuit is configured to operably control the at least one switch via a first constant ON time, such that a ripple of the output voltage is smaller than a predetermined ripple value and power conversion efficiency of the switching converter is greater than a predetermined efficiency value.

In one embodiment, when the input voltage is smaller than a reference voltage, the switching converter enters an extended conduction mode, wherein in the extended conduction mode, the first loop control circuit is configured to operably keep the at least one switch to be ON via an extended ON time until the output voltage is greater than the reference voltage and the voltage difference is greater than the reference voltage.

In one embodiment, the first loop control circuit includes: a first comparator, which is configured to operably compare the first feedback signal with a first reference signal in the first control mode, so as to generate a first modulation trigger signal, wherein the first modulation trigger signal is configured to operably decide a time point where the inductor starts magnetizing; a current signal generation circuit, which is configured to operably sense the inductor current, so as to generate a current sensing signal; and a current comparison circuit, which is configured to operably compare the current sensing signal with a peak reference signal in the first control mode to generate a comparison output signal, wherein when the comparison output signal indicates that the inductor current has reached peak current level, the first loop control circuit controls the at least one switch to switch the inductor to terminate the magnetizing of the inductor.

In one embodiment, in the first control mode, when the first feedback signal is smaller than the first reference signal, the switching converter starts to supply power to the current signal generation circuit and the current comparison circuit, such that the current signal generation circuit and the current comparison circuit are activated to operate, wherein after the switching converter has started to supply power to the current signal generation circuit and the current comparison circuit for a wakeup delay period, the first loop control circuit starts to trigger the inductor to start magnetizing and the first loop control circuit starts to detect the comparison output signal, so as to decide a termination time point where the magnetizing of the inductor is terminated.

In one embodiment, a current consumed by a first feedback circuit which is configured to operably generate the first feedback signal is smaller than a current consumed by a second feedback circuit which is configured to operably generate the second feedback signal, wherein in the first control mode, the second feedback circuit is an open circuit, such that the current consumed by the second feedback circuit is zero.

In one embodiment, the first feedback signal is a unit gain signal of an output voltage of the output power.

In one embodiment, in the second control mode, the second loop control circuit is configured to operably control the switching of the at least one switch via a second constant ON time, so as to regulate the electric characteristic at the predetermined level.

In one embodiment, the second loop control circuit includes: an error amplification circuit, which is configured to operably amplify a difference between the second feedback signal with a second reference signal in the second control mode, so as to generate an error amplification signal; a second comparator, which is configured to operably compare the error amplification signal with a ramp signal in the second control mode, so as to generate a second modulation trigger signal, wherein the second modulation trigger signal is configured to operably decide a time point where the inductor starts magnetizing; and a timing circuit, which is configured to operably count the second constant ON time triggered by the second modulation trigger signal in the second control mode, so as to decide a termination time point where the magnetizing of the inductor is to be terminated; wherein in the first control mode, the portion of the sub-circuits of the second loop control circuit, of which power supplies being turned off include: the error amplification circuit, the second comparator and/or the timing circuit.

In one embodiment, power consumption of the first loop control circuit is smaller than power consumption of the second loop control circuit.

From another perspective, the present invention provides a conversion control circuit, which is configured to operably control a switching converter, wherein the switching converter includes a power stage circuit, wherein the power stage circuit is configured to operably switch an inductor, so as to convert the input power to the output power; the conversion control circuit comprising: a first loop control circuit, which is configured to operably control switching of the at least one switch by a peak current mode according to a first feedback signal related to the output power and an inductor current of the inductor in a first control mode, so as to regulate an electric characteristic at a predetermined level, wherein in the peak current mode, a peak of the inductor current corresponds to a peak current level; and a second loop control circuit, which is configured to operably control the at least one switch to switch with a switching period according to a second feedback signal related to the output power in a second control mode; wherein when the power stage circuit operates in a discontinuous conduction mode (DCM) for consecutively more than a first predetermined number of the switching periods, the switching converter enters the first control mode, wherein the DCM indicates that: within the switching period, the inductor current flowing through the inductor is reduced to zero until a starting time point of a next switching period, wherein in the first control mode, power supplies for a portion of sub-circuits of the second loop control circuit are turned off, so as to reduce power consumption.

From yet another perspective, the present invention provides a conversion control method, which is configured to operably control a switching converter, wherein the switching converter includes a power stage circuit, wherein the power stage circuit is configured to operably switch an inductor, so as to convert the input power to the output power; the conversion control method comprising the following steps: controlling a switching of the at least one switch by a peak current mode according to a first feedback signal related to the output power and an inductor current of the inductor in a first control mode, so as to regulate an electric characteristic at a predetermined level, wherein in the peak current mode, a peak of the inductor current corresponds to a peak current level; and controlling the at least one switch to switch with a switching period according to a second feedback signal related to the output power in a second control mode; wherein when the power stage circuit operates in a discontinuous conduction mode (DCM) for consecutively more than a first predetermined number of the switching periods, the switching converter enters the first control mode, wherein the DCM indicates that: within the switching period, the inductor current flowing through the inductor is reduced to zero until a starting time point of a next switching period, wherein in the first control mode, power supplies for a portion of sub-circuits of the second loop control circuit are turned off, so as to reduce power consumption.

The present invention proposes a switching converter capable of entering a light-load control mode during light load condition. In the light-load control mode, the switching converter can turn OFF an operation of a major loop. Besides, in the light-load control mode, when the switching converter may enter a bypass mode due to the input voltage getting close to the output voltage, the switching converter is controlled to operate in a light-load constant ON mode with more power-saving, or the switching converter is controlled to operate in an extended conduction mode, which achieves low output ripple voltage, extremely power-saving and higher conversion efficiency.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
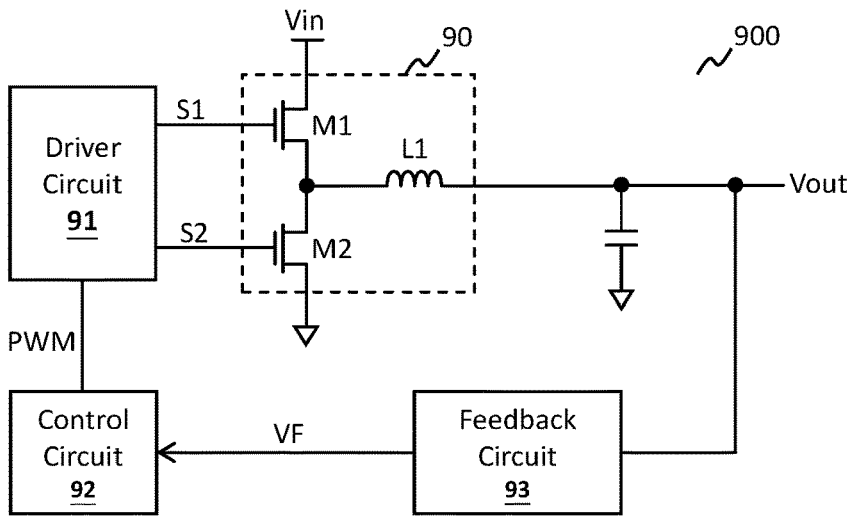
FIG. 1 shows a schematic diagram of a conventional switching converter.
Figure 2:
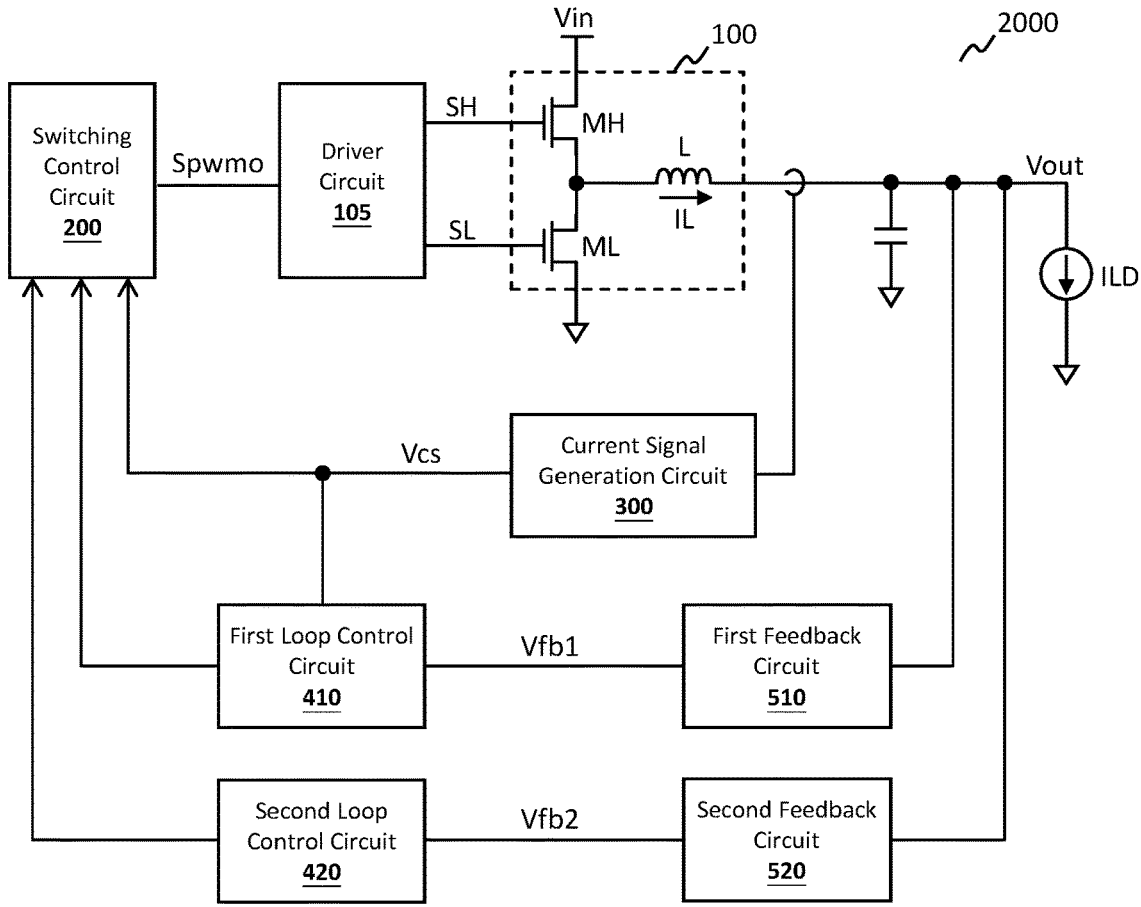
FIG. 2 shows a schematic block diagram of a switching converter according to an embodiment of the present invention.

Please refer to FIG. 2, which shows a schematic block diagram of a switching converter according to an embodiment of the present invention. In one embodiment, as shown in FIG. 2, the switching converter 2000 is configured to operably convert an input power to an output power, wherein the resultant output power is supplied to a load ILD. The input power includes an input voltage Vin, and electrical characteristics of the output power include an output voltage Vout, an output current or an output power level. In one embodiment, the switching converter 2000 comprises: a power stage circuit 100, a first loop control circuit 410 and a second loop control circuit 420. In one embodiment, the power stage circuit 100 includes at least one switch. In this embodiment, the at least one switch includes: a switch MH and a switch ML, which are configured to operably switch an inductor L, so as to convert the input power to the output power.

In one embodiment, the switching converter 2000 further comprises: a driver circuit 105, a switching control circuit 200, a current signal generation circuit 300, a first feedback circuit 510 and a second feedback circuit 520. In one embodiment, the current signal generation circuit 300 is configured to operably generate a current sensing signal Vcs according to an inductor current IL flowing through the inductor L. The Switching control circuit 200 is configured to operably generate a modulation signal Spwmo. The driver circuit 105 is configured to operably generate a driving signal SH and a driving signal SL in accordance with the modulation signal Spwmo, wherein the driving signal SH and the driving signal SL are configured to control the switch MH and the switch ML, respectively, to switch the inductor L. In one embodiment, the first feedback circuit 510 is configured to operably generate a first feedback signal Vfb1 related to the output power, and the second feedback circuit 520 is configured to operably generate a second feedback signal Vfb2 related to the output power.

In one embodiment, the first loop control circuit 410 is configured to operably control a switching of the switch MH and the switch ML by a peak current mode according to a first feedback signal Vfb1 and current sensing signal Vcs in a first control mode, so as to regulate an electric characteristic at a predetermined level. The details and the features of the peak current mode will be explained in the following embodiments.

In one embodiment, the second loop control circuit 420 is configured to operably control the switch MH and the switch ML to switch with a switching period according to a second feedback signal Vfb2 in a second control mode. In one embodiment, the load ILD has a load current, wherein the level of the load current is relatively lower in the first control mode and is relatively higher in the second control mode. In one embodiment, when the power stage circuit 100 operates in a discontinuous conduction mode (DCM) for consecutively more than a first predetermined number of the switching periods (i.e., which indicates that the load ILD enters a light loading), the switching converter 2000 enters the first control mode. It is worthwhile noting that, the DCM indicates that: within the switching period, the inductor current IL flowing through the inductor L is reduced to zero until a starting time point of a next switching period. In one embodiment, in the first control mode, power supplies for a portion of sub-circuits of the second loop control circuit 420 are turned off, so as to reduce power consumption.

In one embodiment, in the above-mentioned first control mode, during a second predetermined number of the switching periods, when a number of the switching periods in which the power stage circuit 100 operates in the DCM is smaller than a third predetermined number (i.e., which indicates that the load ILD turns back to a heavy loading or an intermediate loading), the switching converter 2000 enters the second control mode. In one embodiment, power consumption (i.e., current consumption amount or power consumption level) of the first loop control circuit 410 is smaller than power consumption of the second loop control circuit 420. The operation procedures and the details regarding the first loop control circuit 410, the second loop control circuit 420, the first control mode and the second control mode will be elaborated in the following embodiments.

Figure 3:
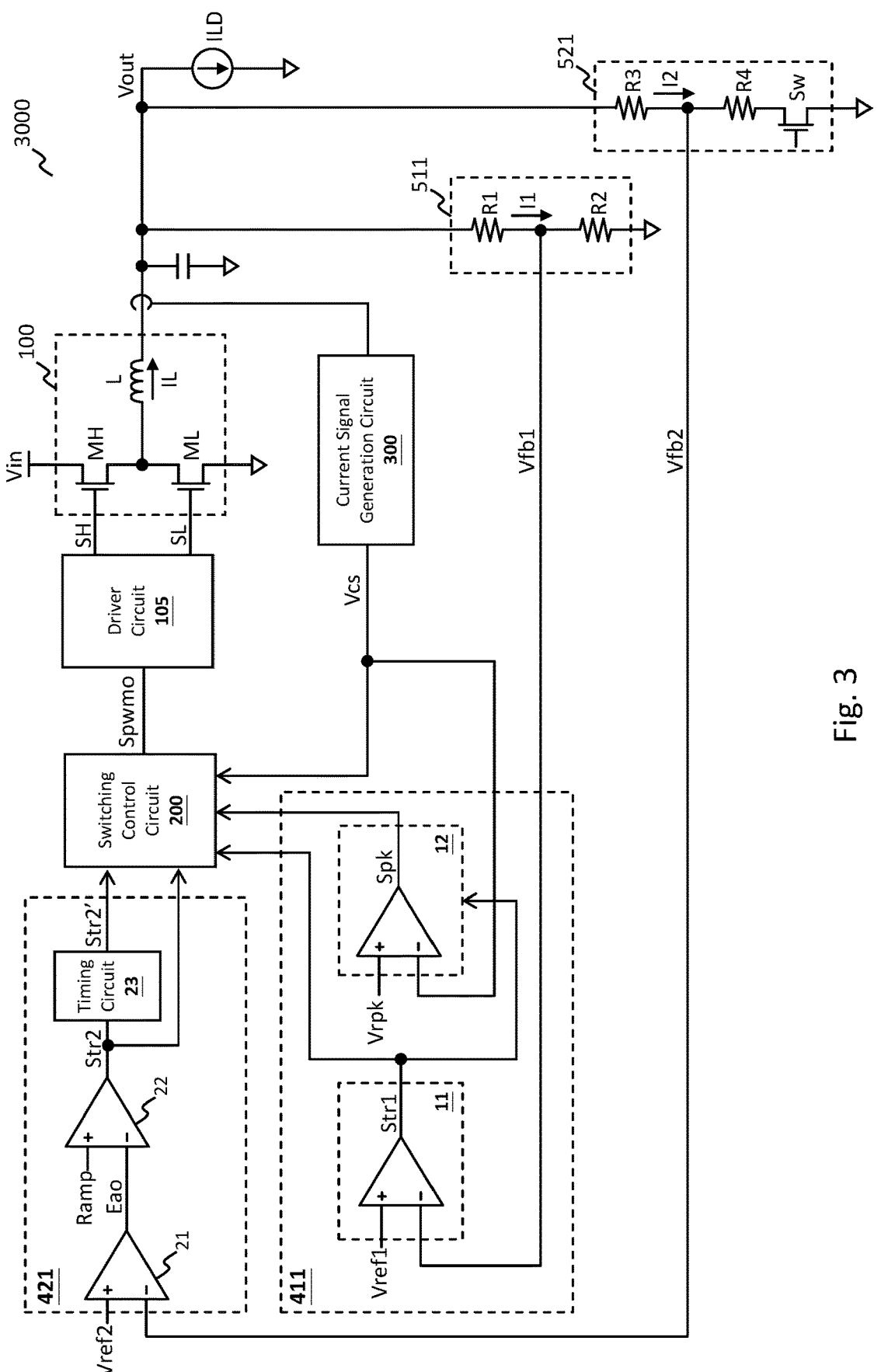
FIG. 3 shows a schematic diagram of a switching converter according to a specific embodiment of the present invention.

Please refer to FIG. 3, which shows a schematic diagram of a switching converter according to a specific embodiment of the present invention. The switching converter 3000 of this embodiment shown in FIG. 3 is similar to the switching converter 2000 of the embodiment shown in FIG. 2, but is different in that: in one embodiment, a first feedback circuit 511 of the switching converter 3000 of this embodiment shown in FIG. 3 includes: a resistor R1 and a resistor R2. A second feedback circuit 521 includes: a resistor R3, a resistor R4 and a switch Sw. In one embodiment, a first loop control circuit 411 includes: a first comparator 11 and a current comparison circuit 12. A second loop control circuit 421 includes: an error amplification circuit 21, a second comparator 22 and a timing circuit 23. In one embodiment, the resistor R1 and the resistor R2 are configured to divide the output voltage Vout to generate the first feedback signal Vfb1. The resistor R3 and the resistor R4 are configured to divide the output voltage Vout to generate the second feedback signal Vfb2. In one embodiment, a current I1 of a first feedback circuit 511 which is configured to operably generate the first feedback signal Vfb1 is smaller than a current I2 of a second feedback circuit 521 which is configured to operably generate the second feedback signal Vfb2.

Figure 4A:
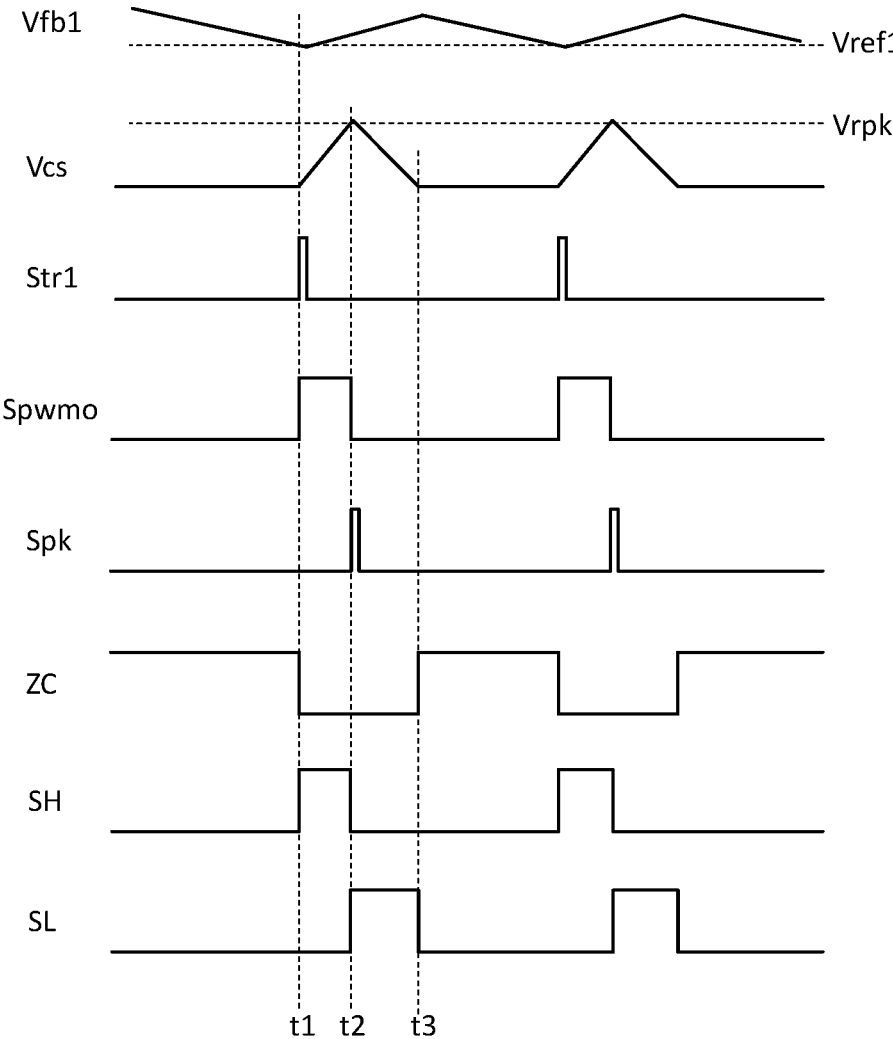
FIG. 4A illustrates a signal waveform diagram depicting operation of a first loop control circuit in a switching converter according to an embodiment of the present invention.
Figures 9A, 9B:
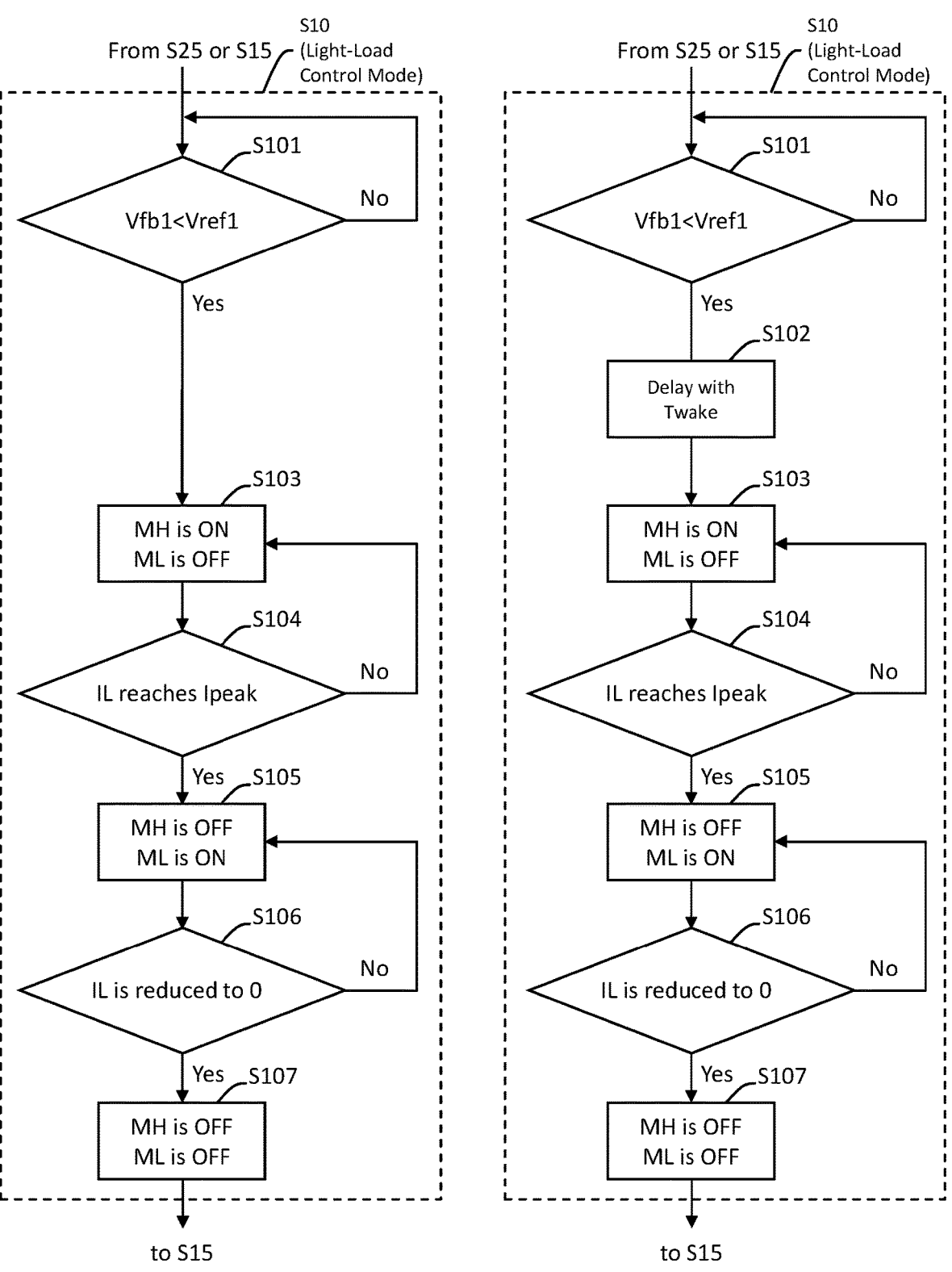
FIG. 9A is a flow chart diagram depicting operation procedures for a switching converter corresponding to the embodiment of FIG. 4A according to an embodiment of the present invention.
FIG. 9B is a flow chart diagram depicting operation procedures for a switching converter corresponding to the embodiment of FIG. 4B according to an embodiment of the present invention.

Please refer to FIG. 3 along with FIG. 4A and FIG. 9A. FIG. 4A illustrates a signal waveform diagram depicting operation of a first loop control circuit in a switching converter according to an embodiment of the present invention. FIG. 9A is a flow chart diagram depicting operation procedures for a switching converter corresponding to the embodiment of FIG. 4A according to an embodiment of the present invention. In this embodiment, a light-load control mode (i.e., step S10) is literally referred to as the aforementioned first control mode described throughout the description of the present invention. FIG. 9A simply demonstrates operation details of the step S10 according to an embodiment of the present invention. Operation details and relationships between the step S10, a determination step S15 and a determination step S25 will be elaborated in detail in sections describing the embodiment of FIG. 7.

In one embodiment, in the light-load control mode (i.e., step S10), firstly, the switching converter 2000 enters a determination step S101, which includes: determining whether a level of the first feedback signal Vfb1 is smaller than the first reference signal Vref1, wherein if the determination step S101 is determined yes, proceeding to a step S103 or otherwise returning to the determination step S101. In the determination step S101, the first comparator 11 is configured to operably compare the first feedback signal Vfb1 with the first reference signal Vref1 to generate a first modulation trigger signal Str1, so as to decide a time point where the inductor L starts magnetizing. To elaborate in more detail, as shown by a time point t1 in FIG. 4A, because the modulation signal Spwmo is turned to a high level according to the first modulation trigger signal Str1 (i.e., the determination step S101 is determined yes), the switch MH is turned ON according to the driving signal SH (corresponding to the step S103), so that the inductor L starts magnetizing. As a result, in this case, the inductor current IL and the current sensing signal Vcs start to ramp up.

As described above, the switching converter 2000 performs power conversion by the peak current mode in the first control mode. To elaborate in more detail, subsequent to the step S103, the switching converter 2000 proceeds to a determination step S104 which includes: determining whether a level of the inductor current IL reaches a peak current level Ipeak, wherein if the determination step S104 is determined yes, proceeding to a step S105 or otherwise returning to the step S103 (i.e., in the step S103, the switch MH is kept ON until the inductor current IL reaches the peak current level Ipeak). In the determination step S104, the current comparison circuit 12 is configured to operably compare the current sensing signal Vcs related to the inductor current IL with a peak reference signal Vrpk to generate a comparison output signal Spk. In one embodiment, in the peak current mode, a peak of the inductor current IL corresponds to the peak current level Ipeak. In one embodiment, when the level of the current sensing signal Vcs exceeds the peak current level Ipeak, the comparison output signal Spk indicates that the inductor current IL has reached peak current level Ipeak (i.e., the determination step S104 is determined yes). As shown by a time point t2 in FIG. 4A, the modulation signal Spwmo is turned to a low level in accordance with the comparison output signal Spk, so that the switch MH is turned OFF according to the driving signal SH (corresponding to the step S105), thereby the inductor L stops magnetizing and starts to be demagnetized. As a consequence, the inductor current IL and the current sensing signal Vcs start to decline.

Next, subsequent to the step S105, the process proceeds to a determination step S106 which includes: determining whether the inductor current IL reaches zero, wherein if the determination step S106 is determined yes, proceeding to a step S107 or otherwise returning to the step S105 (i.e., in the step S105, the switch ML is kept ON until the inductor current IL reaches zero). In the determination step S106, a zero current signal ZC is configured to indicate that the inductor current IL is zero. At a time point t3 shown in FIG. 4A, because the zero current signal ZC is turned to a high level (i.e., the determination step S106 is determined yes), the driving signal SL controls the switch ML to be OFF according to the zero current signal ZC, while in the meantime, the switch MH remains OFF (i.e., corresponding to the step S107), so that the inductor L stops demagnetization.

Figure 4B:
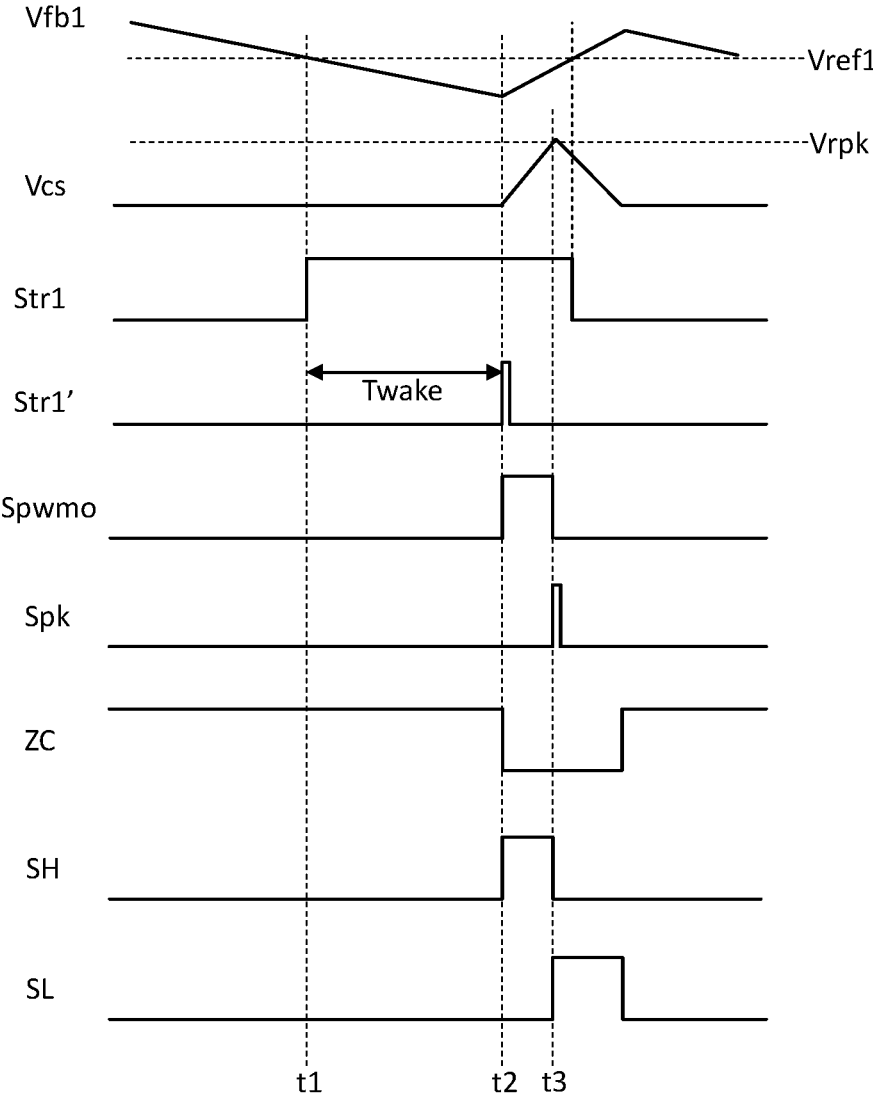
FIG. 4B illustrates a signal waveform diagram depicting operation of a first loop control circuit in a switching converter according to an embodiment of the present invention.

Please refer to FIG. 3 along with FIG. 4B and FIG. 9B. FIG. 4B illustrates a signal waveform diagram depicting operation of a first loop control circuit in a switching converter according to an embodiment of the present invention. FIG. 9B is a flow chart diagram depicting operation procedures for a switching converter corresponding to the embodiment of FIG. 4B according to an embodiment of the present invention. The flow chart diagram of FIG. 9A is similar to the flow chart diagram of FIG. 9B, but is different in that: as compared to the embodiment shown in FIG. 9A, in the embodiment shown in FIG. 9B, if the determination step S101 is determined yes, the switching converter 2000 further proceeds to a step S102, which includes: after a wakeup delay period Twake, proceeding to a step S103. Likewise, the signal waveform diagram of FIG. 4A is similar to the signal waveform diagram of FIG. 4B, but is different in that: in one embodiment, in the first control mode, when a level of the first feedback signal Vfb1 is smaller than the first reference signal Vref1 (as shown by a time point t1 in FIG. 4B), the first modulation trigger signal Str1 indicates that power supply starts to be supplied to the current comparison circuit 12 for operation. After a wakeup delay period Twake subsequent to the switching converter 2000 starting to supply power to the current comparison circuit 12 (i.e., corresponding to the step S102), until a time point t2 shown in FIG. 4B, the first loop control circuit 411 starts to trigger the inductor L via a first modulation trigger signal Str1' to start magnetizing and the first loop control circuit 411 starts to detect the comparison output signal Spk to decide a termination time point (i.e., at a time point t3 shown in FIG. 4B) where the magnetizing of the inductor L is to be terminated. The operation details of the first modulation trigger signal Str1' will be elaborated later.

Figure 5:
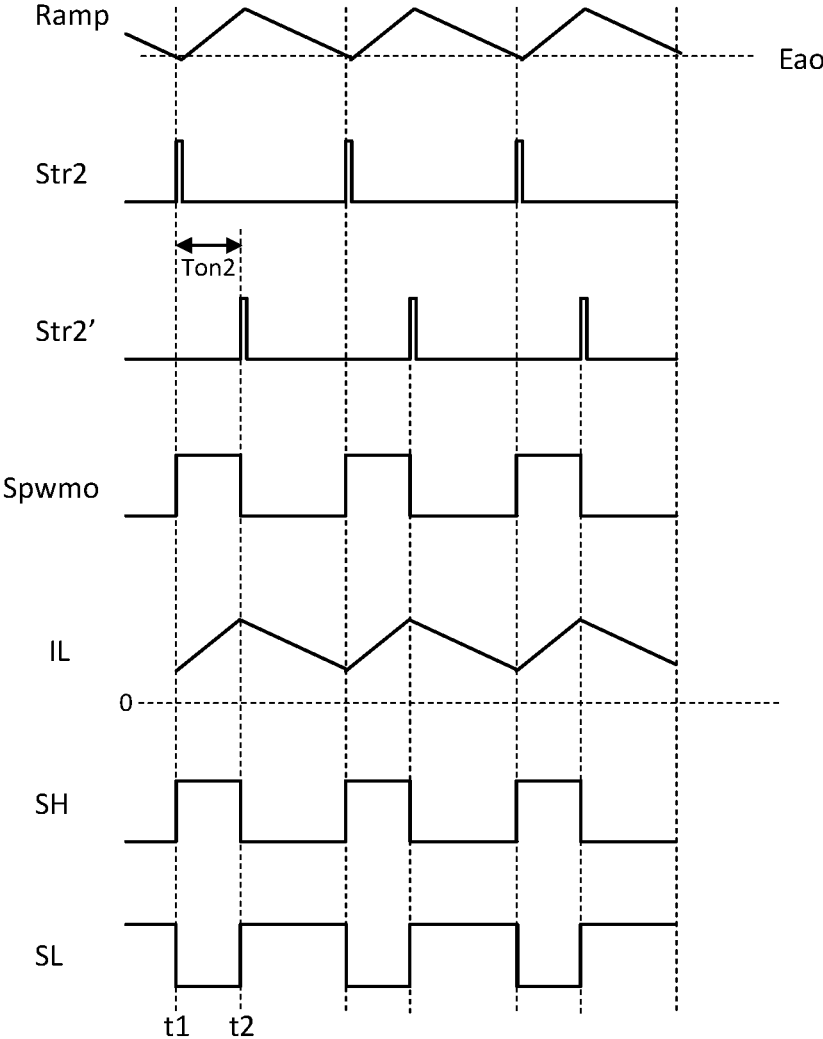
FIG. 5 illustrates a signal waveform diagram depicting operation of a second loop control circuit in a switching converter according to an embodiment of the present invention.

Please refer to FIG. 3 along with FIG. 5. FIG. 5 illustrates a signal waveform diagram depicting operation of a second loop control circuit in a switching converter according to an embodiment of the present invention. In one embodiment, the second loop control circuit 421 is configured to operably control switching of the switch MH and the switch ML via a constant ON time Ton2 in a second control mode, so as to regulate an electric characteristic at a predetermined level. In one specific embodiment, the error amplification circuit 21 is configured to operably amplify a difference between the second feedback signal Vfb2 and a second reference signal Vref2 in the second control mode, so as to generate an error amplification signal Eao. The second comparator 22 is configured to operably compare the error amplification signal Eao with a ramp signal Ramp in the second control mode to generate a second modulation trigger signal Str2, so as to decide a time point where the inductor L starts magnetizing. To elaborate in more detail, as shown by a time point t1 in FIG. 5, because the modulation signal Spwmo is turned to a high level according to the second modulation trigger signal Str2, the switch MH is turned ON according to the driving signal SH, so that the inductor L starts magnetizing. In one embodiment, the timing circuit 23 is configured to operably count the second constant ON time Ton2 triggered by the second modulation trigger signal Str2 in the second control mode, so as to generate a second modulation trigger signal Str2'. At a time point t2 shown in FIG. 5, the second modulation trigger signal Str2' is configured to trigger the modulation signal Spwmo to be turned to a low level, so as to decide a termination time point (i.e., a time point t2) where the magnetizing of the inductor L is to be terminated, while in the meantime, the switch ML is turned ON according to the driving signal SL, whereby the inductor L starts to be demagnetized. In this embodiment, when a load condition is in an intermediate loading or in a heavy loading, the second loop control circuit 421 is configured to operably control the switching converter 3000 to perform power switching via a constant ON time Ton2, which is referred to as a heavy-load constant ON mode.

Figure 6A:
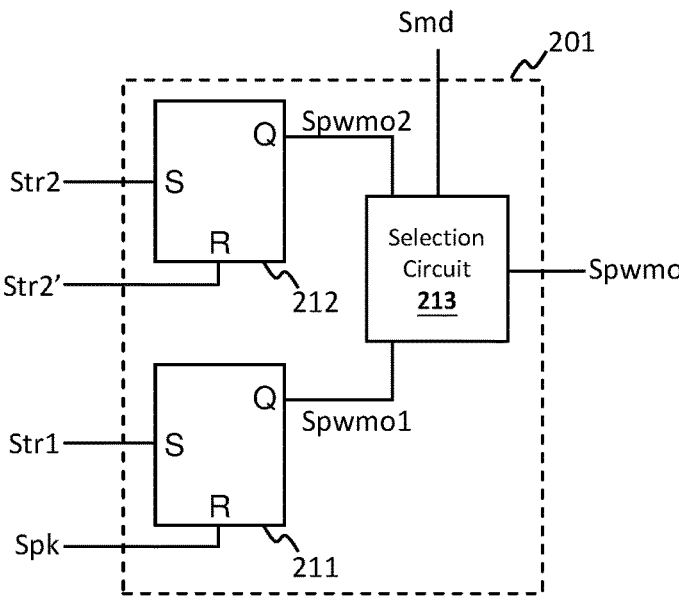
FIG. 6A shows a schematic diagram of a part of a switching control circuit in a switching converter according to an embodiment of the present invention.

Please refer to FIG. 6A, which shows a schematic diagram of a part of a switching control circuit in a switching converter according to an embodiment of the present invention. The embodiment shown in FIG. 6A corresponds to the signal waveform diagram of FIG. 4A and the signal waveform diagram of FIG. 5. In one embodiment, as shown in FIG. 6A, the switching control circuit 201 includes: a state circuit 211, a state circuit 212 and a selection circuit 213. In this embodiment, the state circuit 211 and the state circuit 212 can be, for example but not limited to, SR latches. In one embodiment, on one hand, in a first control mode, the state circuit 211 is configured to operably generate a sub-modulation signal Spwmo1 according to the first modulation trigger signal Str1 and the comparison output signal Spk. On the other hand, in a second control mode, the state circuit 212 is configured to operably generate a sub-modulation signal Spwmo2 according to the second modulation trigger signal Str2 and the second modulation trigger signal Str2'. The selection circuit 213 is configured to operably select the sub-modulation signal Spwmo1 as a modulation signal Spwmo according to a mode selection signal Smd in the first control mode and is configured to operably select the sub-modulation signal Spwmo2 as the modulation signal Spwmo according to the mode selection signal Smd in the second control mode.

Figure 6B:
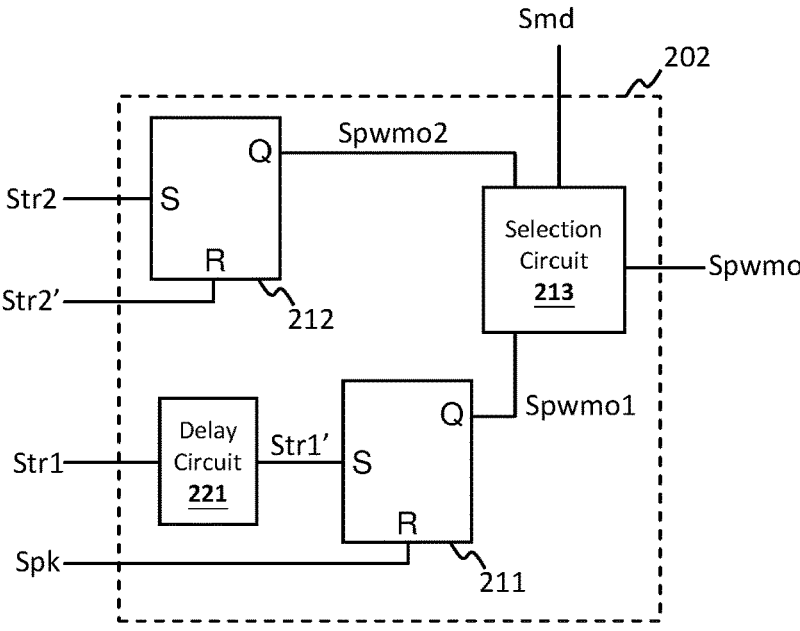
FIG. 6B shows a schematic diagram of a part of a switching control circuit in a switching converter according to an embodiment of the present invention.

Please refer to FIG. 6B, which shows a schematic diagram of a part of a switching control circuit in a switching converter according to an embodiment of the present invention. The embodiment shown in FIG. 6B corresponds to the signal waveform diagram of FIG. 4B and the signal waveform diagram of FIG. 5. The switching control circuit 202 of this embodiment shown in FIG. 6B is similar to the switching control circuit 201 of the embodiment shown in FIG. 6A, but is different in that: in one embodiment, the switching control circuit 202 further includes a delay circuit 221. Please refer to FIG. 4B along with FIG. 6B. In one embodiment, the delay circuit 221 is configured to operably count a wakeup delay period Twake triggered by the first modulation trigger signal Str1 to generate the first modulation trigger signal Str1'. At a time point t2 shown in FIG. 4B, because the modulation signal Spwmo is turned to a high level according to the first modulation trigger signal Str1', the switch MH is turned ON according to the driving signal SH, so that the inductor L starts magnetizing.

It is worthwhile mentioning that, in one embodiment, within a period where a modulation signal Spwmo is turned OFF, the current signal generation circuit 300 is controlled to become at a power-saving state. In the embodiments of FIG. 4B and FIG. 6B, the current signal generation circuit 300 is ensured to be ready by counting the wakeup delay period Twake via the delay circuit 221. For example, a bias current of the current signal generation circuit 300 has reached a normal level during wakeup delay period Twake, so that it is ensured that the current signal generation circuit 300 can normally operate, and the modulation signal Spwmo will then be triggered by the first modulation trigger signal Str1'.

Figure 7:
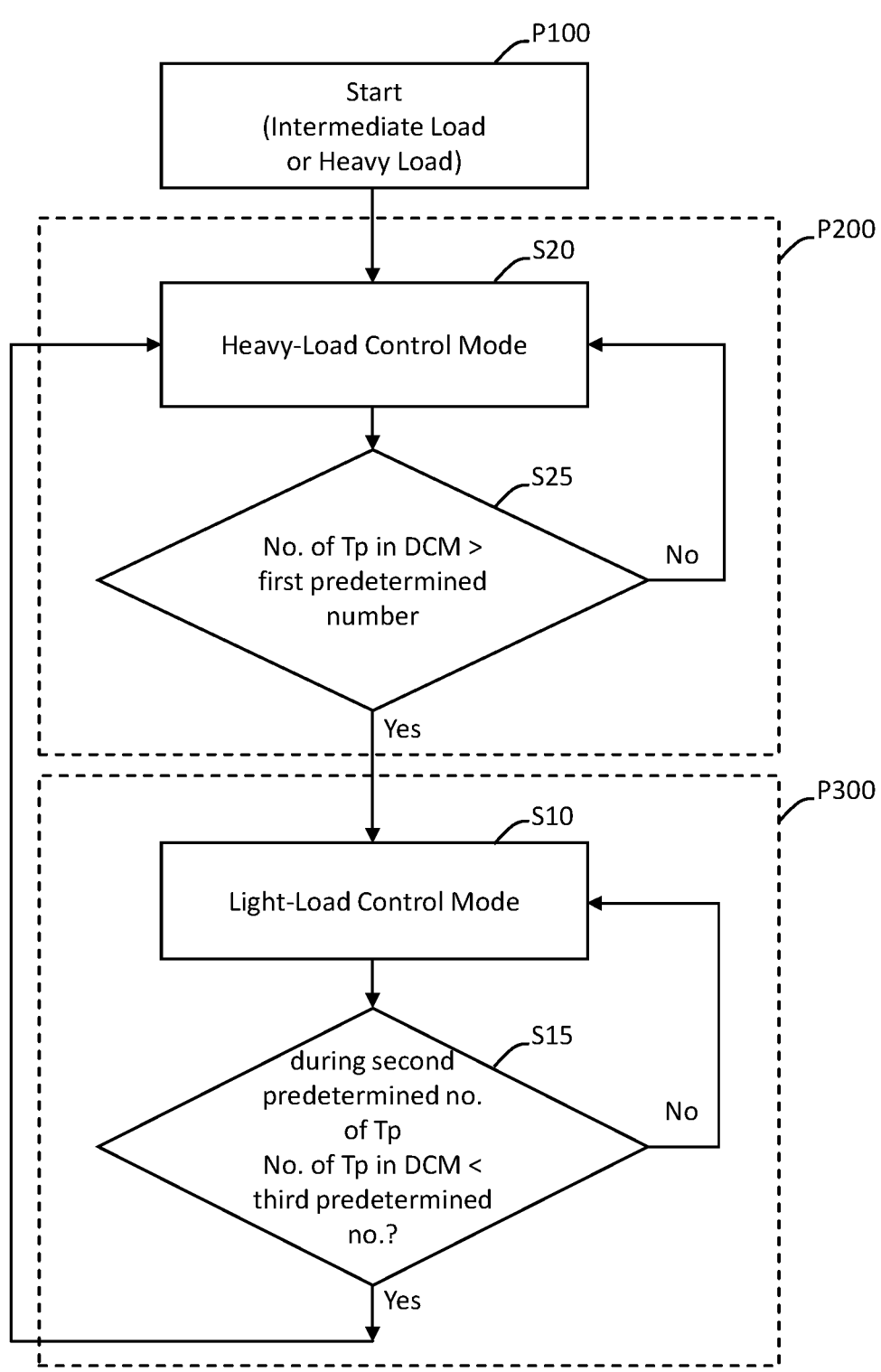
FIG. 7 is a flow chart diagram depicting operation procedures for a switching converter according to an embodiment of the present invention.
Figure 8:
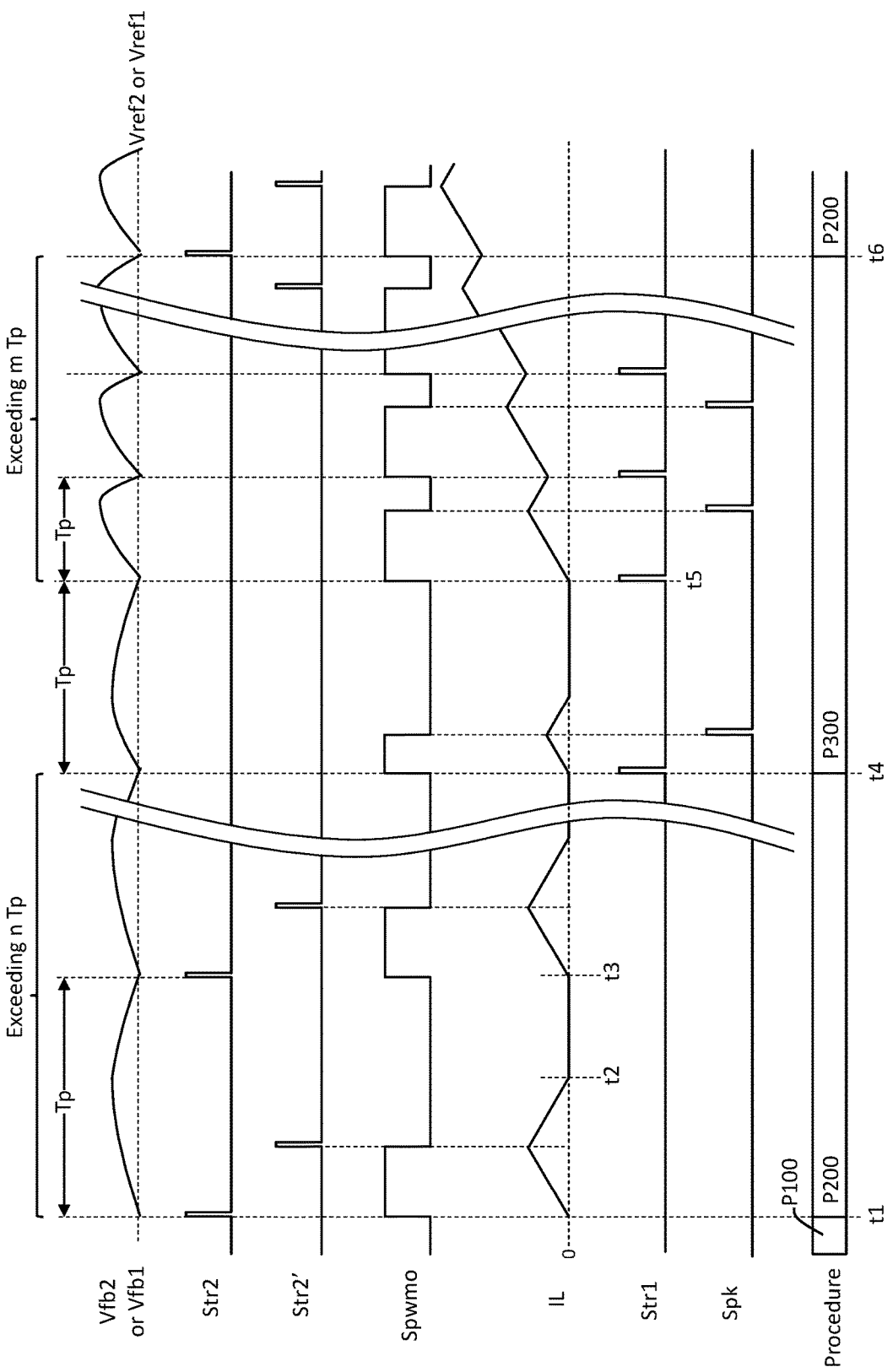
FIG. 8 illustrates a signal waveform diagram depicting operation of a switching converter according to an embodiment of the present invention.

Please refer to FIG. 3 along with FIG. 7 and FIG. 8. FIG. 7 is a flow chart diagram depicting operation procedures for a switching converter according to an embodiment of the present invention. FIG. 8 illustrates a signal waveform diagram depicting operation of a switching converter according to an embodiment of the present invention. In one embodiment, the switching converter 3000 starts to operate at a procedure P100. In this embodiment, subsequent to the procedure P100, the switching converter 3000 is predetermined to enter a step S20 of a procedure P200 at a time point t1 shown in FIG. 8, wherein the step S20 is literally referred to as a heavy-load control mode. In this embodiment, the heavy-load control mode (i.e., step S20) is literally referred to as the aforementioned second control mode described throughout the description of the present invention. In the heavy-load control mode (i.e., step S20), power supply of the first loop control circuit 411 is turned off, and the second loop control circuit 421 is in charge of loop control. In regard to the operation details of the second loop control circuit 421, please refer to detailed elaboration concerning the aforementioned embodiments of FIG. 3 and FIG. 5. Next, the switching converter 3000 enters a determination step S25 of the procedure P200, which includes: determining whether the power stage circuit 100 operates in a discontinuous conduction mode (DCM) for consecutively more than a first predetermined number of the switching periods Tp (e.g., as shown by n in FIG. 8, wherein the first predetermined number can be for example n, wherein n is a positive integer greater than one), wherein if the determination step S25 is determined yes (i.e., which indicates that the load ILD has already been in a light-load condition), proceeding to a procedure P300 or otherwise proceeding to the step S20 (i.e., which indicates that the load ILD is in an intermediate loading or in a heavy loading condition). For example, in one embodiment, as shown by a time point t4 in FIG. 8, it is determined that the power stage circuit 100 has already operated in the DCM during consecutively more than n switching periods Tp, so the switching converter 3000 proceeds to the procedure P300. It is worthwhile noting that, in this embodiment, the aforementioned DCM indicates that: within a present switching period Tp, the inductor current IL flowing through the inductor L is reduced to zero (i.e., at a time point t2 shown in FIG. 8) until a starting time point (i.e., at a time point t3 shown in FIG. 8) of a next switching period Tp.

In one embodiment, in the procedure P300, firstly, the switching converter 3000 enters a step S10 (i.e., a light-load control mode). In this embodiment, the light-load control mode (i.e., step S10) is literally referred to as the aforementioned first control mode described throughout the description of the present invention. In the light-load control mode (i.e., step S10), loop of the converter is controlled by the first loop control circuit 411. In the meantime, power supplies for a portion of sub-circuits of the second loop control circuit 421 are turned off, so as to reduce power consumption. In one embodiment, the portion of the sub-circuits of the second loop control circuit 421, of which power supplies being turned off include: the error amplification circuit 21, the second comparator 22 and/or the timing circuit 23. During a period of the procedure P300 ranging from a time point t3 to a time point t4 in FIG. 8, in regard to the operation details of the first loop control circuit 411, please refer to detailed elaboration concerning the aforementioned embodiments of FIG. 3 and FIG. 4A. Next, the switching converter 3000 enters a determination step S15 of the procedure P300 which includes: determining during a second predetermined number of the switching periods Tp (e.g., as shown by m in FIG. 8, wherein the second predetermined number can be for example m, wherein m is a positive integer greater than one), whether a number of the switching periods in which the power stage circuit 100 operates in the DCM is smaller than a third predetermined number (e.g., as shown in FIG. 8, the third predetermined number can be for example one), wherein if the determination step S15 is determined yes (i.e., which indicates that the load ILD condition is in an intermediate loading or in a heavy loading), returning to the procedure P200 or otherwise proceeding to the step S10 (i.e., which indicates that the load ILD condition remains as a light loading). To elaborate in more detail, in one embodiment, during a period of the m switching periods Tp ranging from a time point t5 to a time point t6 in FIG. 8, because a number of the switching periods in which the power stage circuit 100 operates in the DCM is zero (which is smaller than one), the switching converter 3000 returns to the procedure P200 at the time point t6 shown in FIG. 8.

It is worthwhile noting that, in the aforementioned embodiments shown in FIG. 7 and FIG. 8, after the switching converter 3000 has operated in the procedure P100, the switching converter 3000 is to enter the procedure P200 as default. It should be understood that such implementation in the above-mentioned preferred embodiment is only an illustrative example, but not for limiting the broadest scope of the present invention. In other embodiments, it is also practicable and within the broadest scope of the present invention that: after the switching converter 3000 has operated in the procedure P100, the switching converter 3000 can alternatively enter the procedure P300 as default. As a consequence, in this case, when the determination step S15 of the procedure P300 is determined yes, the switching converter 3000 will proceed to the procedure P200. Those skilled in this art can readily conceive the operation procedures and details of the procedure P200 through the detailed explanations in the aforementioned embodiments shown in FIG. 7 and FIG. 8, so the details thereof are not redundantly repeated here.

Moreover, it is worthwhile noting that, when the load ILD is at light-load condition, the present invention will turn off power supplies for a portion of sub-circuits of the second loop control circuit 421 through a light-load control mode (i.e., step S10). Additionally, through adopting a light-load control mode (i.e., step S10), the present invention can further control the second feedback circuit 521 to become an open circuit (e.g., by turning off the switch Sw shown in FIG. 3), such that the current I2 of the second feedback circuit 521 is zero, so as to reduce power consumption of the switching converter 3000. Furthermore, when a resistance of the resistor R1 shown in FIG. 3 is zero, the first feedback signal Vfb1 is a unit gain signal of the output voltage Vout of the output power, i.e., a voltage level of the first feedback signal Vfb1 is equal to a voltage level of the output voltage Vout, which can also reduce power consumption of the switching converter 3000.

FIG. 9A is a flow chart diagram depicting operation procedures for a switching converter corresponding to the embodiment of FIG. 4A in the light-load control mode (i.e., step S10) shown in FIG. 7 according to an embodiment of the present invention, and FIG. 9B is a flow chart diagram depicting operation procedures for a switching converter in the light-load control mode (i.e., step S10) shown in FIG. 7 corresponding to the embodiment of FIG. 4B according to an embodiment of the present invention. In regard to the details and features of FIG. 9A and FIG. 9B, please refer to the aforementioned descriptions elaborated in the embodiments of FIG. 3, FIG. 4A, FIG. 4B and FIG. 7, so the details thereof are not redundantly repeated here.

Figure 10:
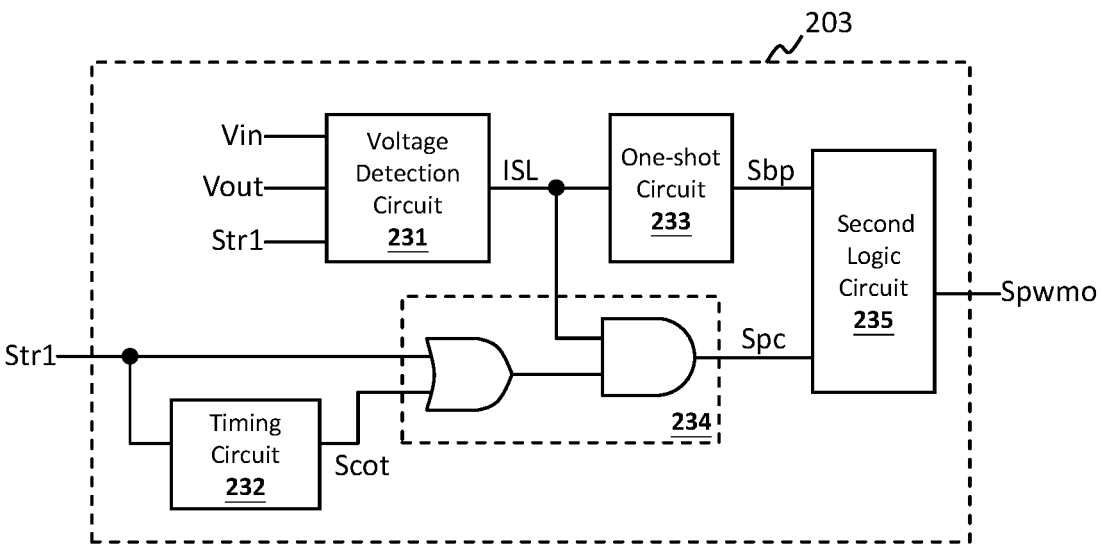
FIG. 10 shows a schematic diagram of a part of a switching control circuit in a switching converter according to an embodiment of the present invention.

Please refer to FIG. 10, which shows a schematic diagram of a part of a switching control circuit in a switching converter according to an embodiment of the present invention. In one embodiment, as shown in FIG. 10, the switching control circuit 203 includes: a voltage detection circuit 231, a timing circuit 232, a one-shot circuit 233, a first logic circuit 234 and a second logic circuit 235. In one embodiment, the voltage detection circuit 231 is configured to operably generate an indication signal ISL according to the input voltage Vin and the output voltage Vout. The one-shot circuit 233 is configured to operably generate a pulse signal Sbp according to the indication signal ISL. In one embodiment, the timing circuit 232 is configured to operably count a constant ON time Ton1 triggered by the first modulation trigger signal Str1 to generate a timing signal Scot. In one embodiment, the first modulation trigger signal Str1, the timing signal Scot and the indication signal ISL are configured to operably generate a modulation control signal Spc via the first logic circuit 234. The second logic circuit 235 is configured to operably generate a modulation signal Spwmo according to the modulation control signal Spc and the pulse signal Sbp.

Figure 11:
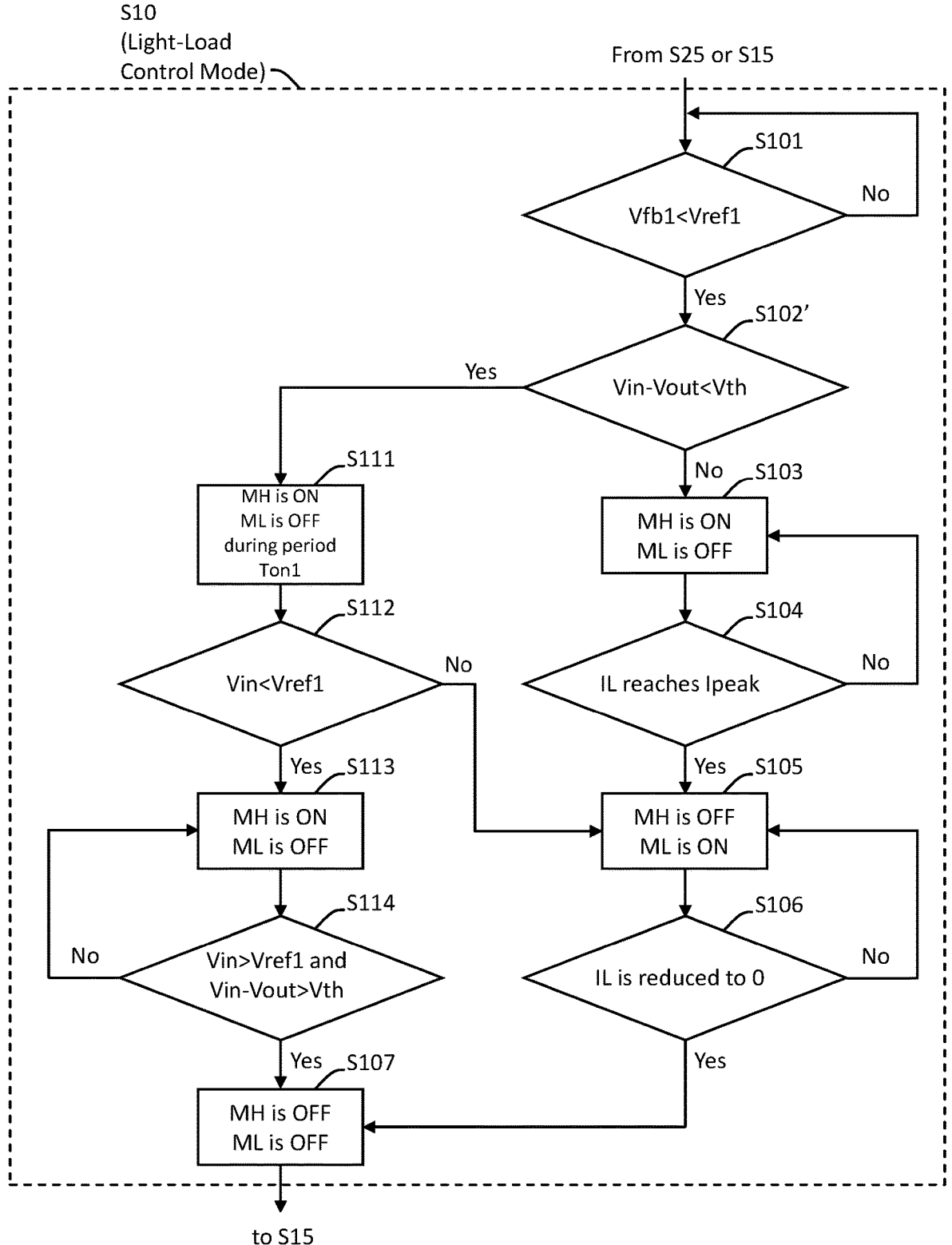
FIG. 11 is a flow chart diagram depicting operation procedures for a switching converter corresponding to the embodiment of FIG. 10 according to an embodiment of the present invention.
Figure 12A:
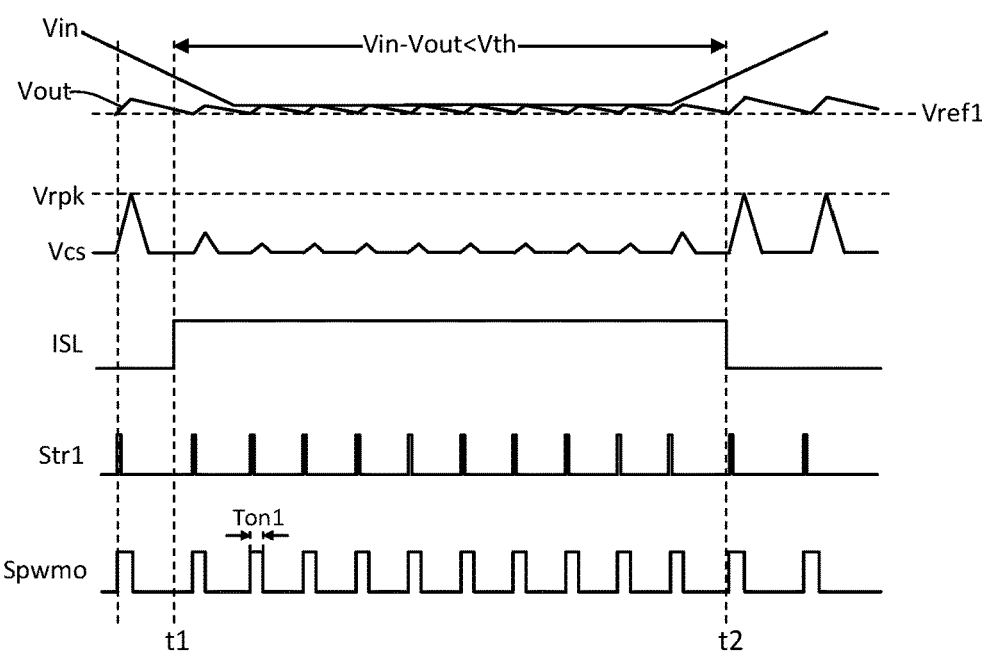
FIG. 12A illustrates a signal waveform diagram depicting operation of the embodiment of FIG. 10 according to an embodiment of the present invention.

Please refer to FIG. 10 in conjunction with FIG. 11 and FIG. 12A. FIG. 11 is a flow chart diagram depicting operation procedures for a switching converter corresponding to the embodiment of FIG. 10 according to an embodiment of the present invention. FIG. 12A illustrates a signal waveform diagram depicting operation of the embodiment of FIG. 10 according to an embodiment of the present invention. The flow chart diagram of FIG. 11 is similar to the flow chart diagram of FIG. 9A, but is different in that: in the embodiment shown in FIG. 11, if a determination step S101 is determined yes, the switching converter 3000 further proceeds to a step S102' which includes: determining whether a voltage difference between an input voltage Vin and an output voltage Vout is smaller than a predetermined difference Vth, wherein if the determination step S102' is determined yes, proceeding to a step S111 (which represents a light-load constant ON mode) or otherwise proceeding to a step S103 (note that: in regard to the operation details of the step S103 and the rest steps subsequent to the step S103, please refer to detailed elaboration concerning the aforementioned embodiment of FIG. 9A). For example, in one embodiment, prior to a time point t1 shown in FIG. 12A, the switching control circuit 203 of FIG. 10 operates in the light-load control mode. At the time point t1 shown in FIG. 12A, because the determination step S102' is determined yes (i.e., the voltage difference between the input voltage Vin and the output voltage Vout is smaller than the predetermined difference Vth), the indication signal ISL generated by the voltage detection circuit 231 is turned to a high level, so that S111 is entered (which represents a light-load constant ON mode). It is worthwhile noting that, in this embodiment, the first feedback signal Vfb1 is a unit gain signal of the output voltage Vout of the output power, i.e., a voltage level of the first feedback signal Vfb1 is equal to a voltage level of the output voltage Vout.

In one embodiment, in the step S111 (which represents a light-load constant ON mode), the first loop control circuit 411 is configured to control the switch MH and the switch ML with a constant ON time Ton1, such that a ripple of the output voltage Vout is smaller than a predetermined ripple value and power conversion efficiency of the switching converter 3000 is greater than a predetermined efficiency value, thereby accomplishing a balance between the ripple of the output voltage Vout and power conversion efficiency in a light-load condition. In this embodiment, when the load is in a light-load condition, the first loop control circuit 411 is configured to operably control the switching converter 3000 to perform power switching with a constant ON time Ton1, which is referred to as a light-load constant ON mode. In one embodiment, as shown in FIG. 11, after the switch MH has been controlled to be ON for the constant ON time Ton1 in the step S111 (which represents a light-load constant ON mode), proceeding to a determination step S112 which includes: determining whether the input voltage Vin remains smaller than a first reference signal Vref1 of a reference voltage, wherein if the determination step S112 is determined yes, it indicates that: even though magnetization of the inductor L has been performed for the constant ON time Ton1, the output voltage Vout remains inherently insufficient (because the switching converter 3000 of this embodiment is a buck converter, wherein in a typical buck converter, the output voltage Vout is inherently smaller than or equal to the input voltage Vin). As a result, in this case, the switching converter 3000 proceeds to a step S113 (which represents an extended conduction mode). On the other hand, if the determination step S112 is determined no, the switching converter 3000 proceeds to a step S105 (note that: in regard to the operation details of the step S105 and the rest steps subsequent to the step S105, please refer to full and detailed elaboration concerning the aforementioned embodiment of FIG. 9A).

In one embodiment, within a period ranging from a time point t1 to a time point t2 in FIG. 12A, because the determination step S112 is determined no, the operation procedures of the step S101, the step S102', the step S111, the step S112, the step S105, the step S106, the step S107 to the step S15 are repeated. In one embodiment, at the time point t2 shown in FIG. 12A, because the indication signal ISL is turned to a low level (i.e., the voltage difference between the input voltage Vin and the output voltage Vout is not smaller than the predetermined difference Vth), the determination step S102' is determined no, a step S103 is proceeded directly.

Figure 12B:
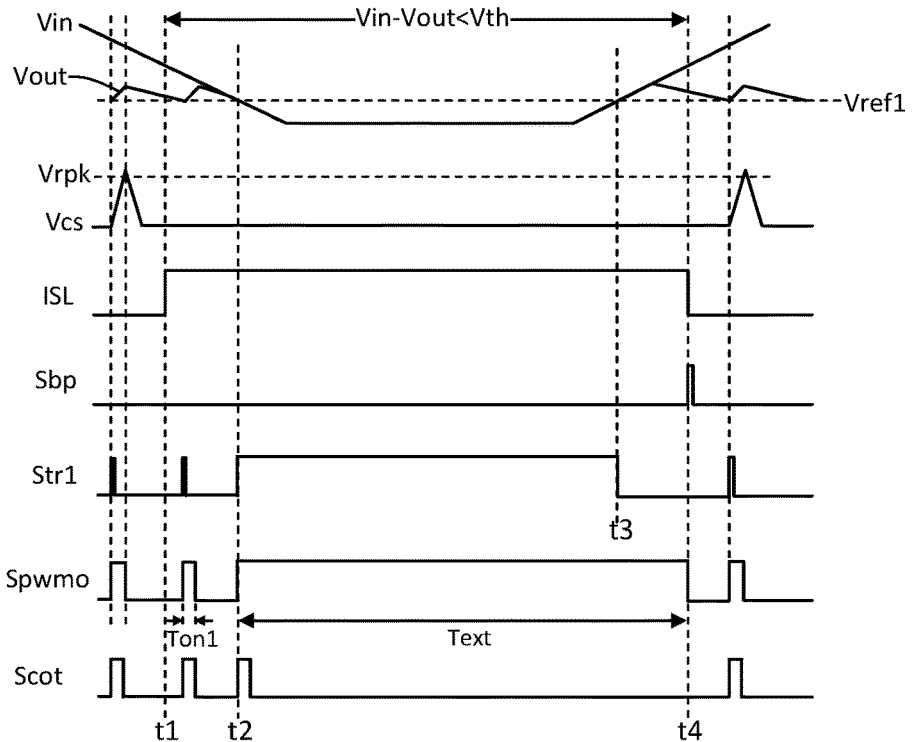
FIG. 12B illustrates a signal waveform diagram depicting operation of the embodiment of FIG. 10 according to an embodiment of the present invention.
Figures 13A, 13B, 13C:
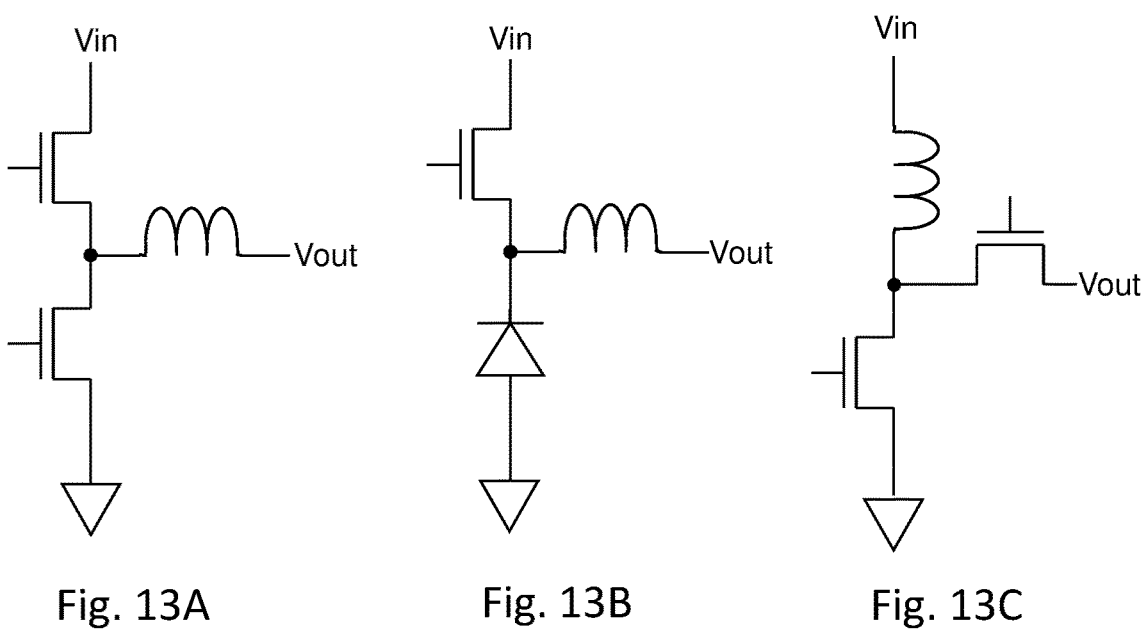
FIG. 13A to FIG. 13L show a schematic diagram of a power stage circuit in a switching converter according to several embodiments of the present invention.
Figures 13D, 13E, 13F:
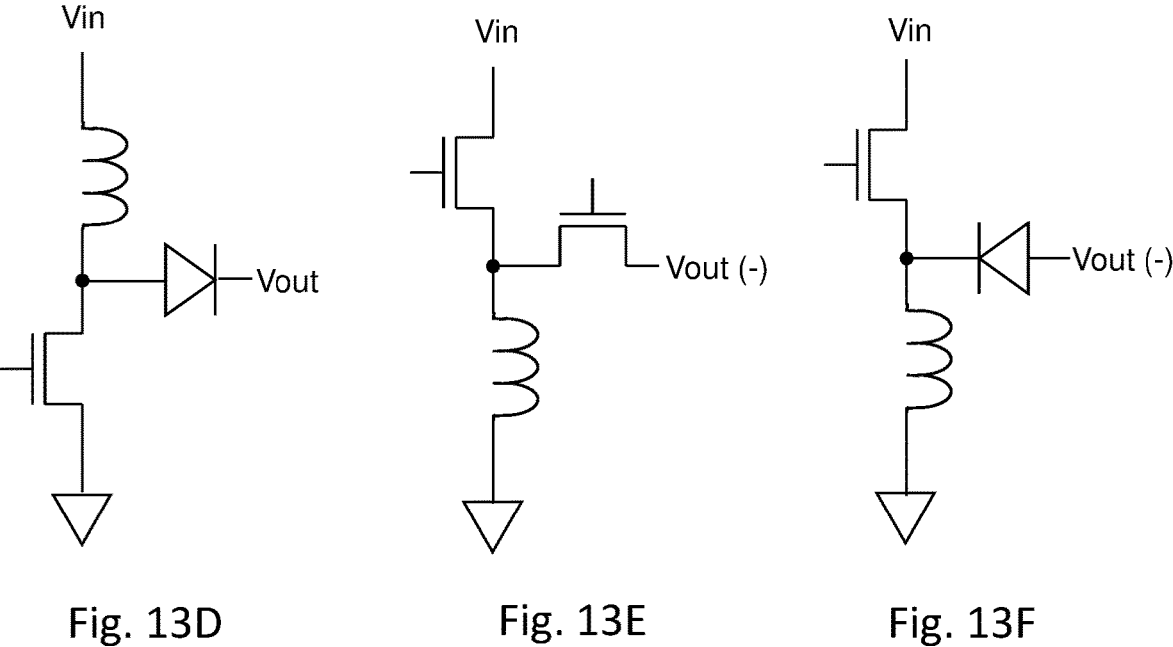
Figure 13G:
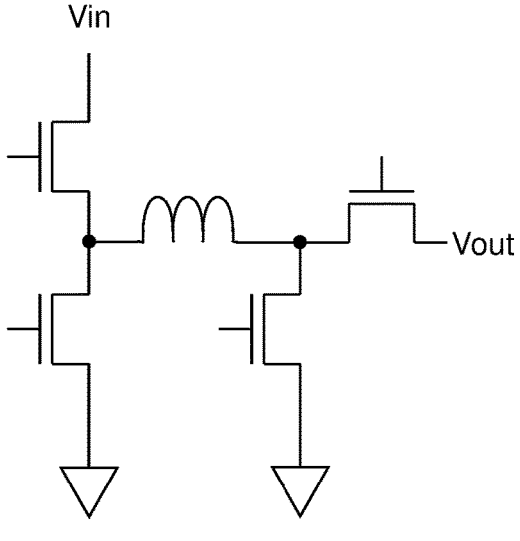
Figure 13H:
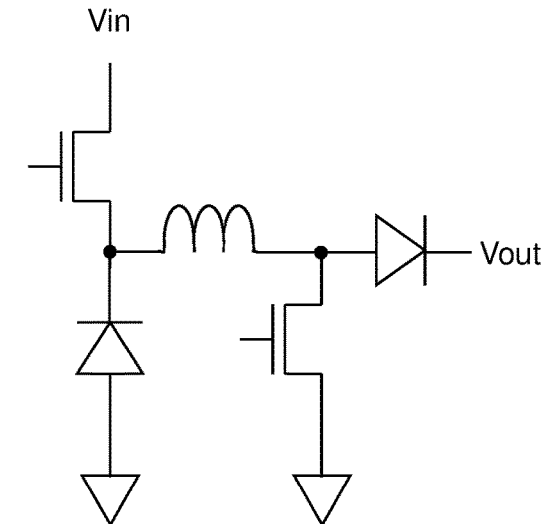
Figure 13I:
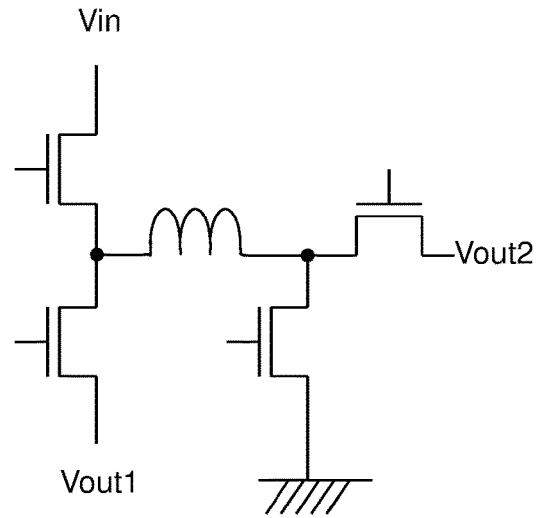
Figure 13I:
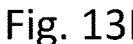
Figure 13J:
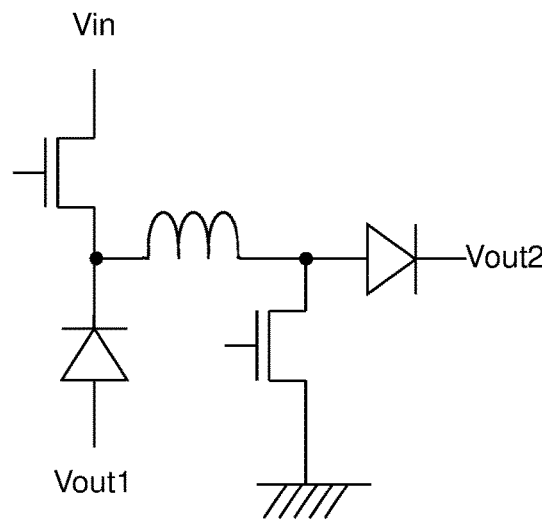
Figure 13K:
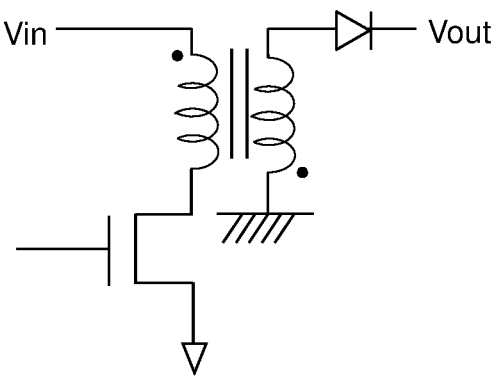
Figure 13L:
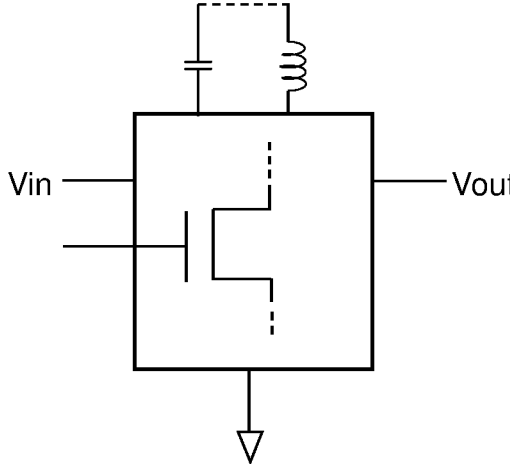

Please refer to FIG. 10 in conjunction with FIG. 11 and FIG. 12B. FIG. 12B illustrates a signal waveform diagram depicting operation of the embodiment of FIG. 10 according to an embodiment of the present invention. In one embodiment, as shown in FIG. 11, in one embodiment, when the determination step S112 is determined yes, the switching converter 3000 proceeds to a step S113 (which represents an extended conduction mode). Next, the switching converter 3000 proceeds to a determination step S114 which includes: determining whether the input voltage Vin is greater than the first reference signal Vref1 of the reference voltage and determining whether the voltage difference between the input voltage Vin and the output voltage Vout is greater than the predetermined difference Vth, wherein if the determination step S114 is determined yes, proceeding to the step S107 or otherwise returning to the step S113 (which represents an extended conduction mode). For example, in one embodiment, as shown in FIG. 12B, at a time point t2 shown in FIG. 12B (in regard to operations prior to a time point t2 shown in FIG. 12B, please refer to detailed elaboration concerning the aforementioned embodiments of FIG. 12A), because the determination step S112 is determined yes (i.e., a voltage level of the input voltage Vin is smaller than a voltage level of the first reference signal Vref1), the switching converter 3000 will proceed to the step S113 (which represents an extended conduction mode).

In one embodiment, in the step S113 (i.e., the extended conduction mode), the first loop control circuit 411 is configured to control the switch MH and the switch ML with a delay ON time Text. To elaborate in more detail, during a period ranging from the time point t2 to a time point t3 in FIG. 12B, because the voltage level of the input voltage Vin is smaller than the voltage level of the first reference signal Vref1, a voltage level of the output voltage Vout is also smaller than the voltage level of the first reference signal Vref1. As a result, in this case, the first modulation trigger signal Str1 remains at a high level during the period ranging from the time point t2 to the time point t3 in FIG. 12B, so that the modulation signal Spwmo keeps at a high level, thus controlling the switch MH to be ON and controlling the switch ML to be OFF. It is worthwhile noting that, during the period ranging from the time point t2 to the time point t3 in FIG. 12B, because the voltage level of the input voltage Vin is smaller than the voltage level of the first reference signal Vref1, the voltage level of the input voltage Vin is substantially equal to the voltage level of the output voltage Vout.

In one embodiment, during a period ranging from the time point t2 to a time point t4 in FIG. 12B, because the determination step S114 is determined no, the operation procedures of the step S113 and the step S114 are repeated. In one embodiment, at the time point t4 shown in FIG. 12B, because the determination step S114 is determined yes (i.e., the input voltage Vin is greater than the first reference signal Vref1 of the reference voltage and the voltage difference between the input voltage Vin and the output voltage Vout is greater than the predetermined difference Vth), the switching converter 3000 proceeds to the step S107 and subsequently proceeds to the determination step S15. Afterwards, the switching converter 3000 returns to the step S10 (i.e., a light-load control mode; in regard to the operation details of the light-load control mode, please refer to full and detailed elaboration concerning the aforementioned embodiments of FIG. 7).

Please refer to FIG. 13A to FIG. 13L, which show a schematic diagram of a power stage circuit in a switching converter according to several embodiments of the present invention. The power stage circuit of the present invention includes: at least one switch and an inductor which are coupled to each other, wherein the at least one switch is configured to switch the inductor according to a control signal, to convert an input power to an output power. As shown in FIG. 13A to FIG. 13L, the power stage circuit of the present invention includes, for example but not limited to, a boost converter, a buck converter, a buck-boost converter, a flyback converter or a switched resonant converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching converter, which is configured to operably convert an input power to an output power; the switching converter comprising:
a power stage circuit which includes at least one switch, wherein the power stage circuit is configured to operably switch an inductor, so as to convert the input power to the output power;
a first loop control circuit, which is configured to operably control switching of the at least one switch by a peak current mode according to a first feedback signal related to the output power and an inductor current of the inductor in a first control mode, so as to regulate an electric characteristic at a predetermined level, wherein in the peak current mode, a peak of the inductor current corresponds to a peak current level; and
a second loop control circuit, which is configured to operably control the at least one switch to switch with a switching period according to a second feedback signal related to the output power in a second control mode;
wherein when the power stage circuit operates in a discontinuous conduction mode (DCM) for consecutively more than a first predetermined number of switching periods, the switching converter enters the first control mode, wherein the DCM indicates that: within the switching period, the inductor current flowing through the inductor is reduced to zero until a starting time point of a next switching period, wherein in the first control mode, power supplies for a portion of sub-circuits of the second loop control circuit are turned off, so as to reduce power consumption;
wherein in the first control mode, during a second predetermined number of the switching periods, when a number of the switching periods in which the power stage circuit operates in the DCM is smaller than a third predetermined number, the switching converter enters the second control mode.

2. The switching converter as claimed in claim 1, wherein a level of a load current of the switching converter is relatively lower in the first control mode and is relatively higher in the second control mode.

3. The switching converter as claimed in claim 1, wherein in the first control mode, when a voltage difference between an input voltage of the input power and an output voltage of the output power is smaller than a predetermined difference, the switching converter enters a light-load constant ON mode, wherein in the light-load constant ON mode, the first loop control circuit is configured to operably control the at least one switch via a first constant ON time, such that a ripple of the output voltage is smaller than a predetermined ripple value and power conversion efficiency of the switching converter is greater than a predetermined efficiency value.

4. The switching converter as claimed in claim 3, wherein when the input voltage is smaller than a reference voltage, the switching converter enters an extended conduction mode, wherein in the extended conduction mode, the first loop control circuit is configured to operably keep the at least one switch to be ON via an extended ON time until the output voltage is greater than the reference voltage and the voltage difference is greater than the reference voltage.

5. The switching converter as claimed in claim 1, wherein the first loop control circuit includes:
a first comparator, which is configured to operably compare the first feedback signal with a first reference signal in the first control mode, so as to generate a first modulation trigger signal, wherein the first modulation trigger signal is configured to operably decide a time point where the inductor starts magnetizing;
a current signal generation circuit, which is configured to operably sense the inductor current, so as to generate a current sensing signal; and
a current comparison circuit, which is configured to operably compare the current sensing signal with a peak reference signal in the first control mode to generate a comparison output signal, wherein when the comparison output signal indicates that the inductor current has reached peak current level, the first loop control circuit controls the at least one switch to switch the inductor to terminate the magnetizing of the inductor.

6. The switching converter as claimed in claim 5, wherein in the first control mode, when the first feedback signal is smaller than the first reference signal, the switching converter starts to supply power to the current signal generation circuit and the current comparison circuit, such that the current signal generation circuit and the current comparison circuit are activated to operate, wherein after the switching converter has started to supply power to the current signal generation circuit and the current comparison circuit for a wakeup delay period, the first loop control circuit starts to trigger the inductor to start magnetizing and the first loop control circuit starts to detect the comparison output signal, so as to decide a termination time point where the magnetizing of the inductor is to be terminated.

7. The switching converter as claimed in claim 1, wherein a current consumed by a first feedback circuit which is configured to operably generate the first feedback signal is smaller than a current consumed by a second feedback circuit which is configured to operably generate the second feedback signal, wherein in the first control mode, the second feedback circuit is an open circuit, such that the current consumed by the second feedback circuit is zero.

8. The switching converter as claimed in claim 7, wherein the first feedback signal is a unit gain signal of an output voltage of the output power.

9. The switching converter as claimed in claim 1, wherein in the second control mode, the second loop control circuit is configured to operably control the switching of the at least one switch via a second constant ON time, so as to regulate the electric characteristic at the predetermined level.

10. The switching converter as claimed in claim 9, wherein the second loop control circuit includes:

an error amplification circuit, which is configured to operably amplify a difference between the second feedback signal and a second reference signal in the second control mode, so as to generate an error amplification signal;

a second comparator, which is configured to operably compare the error amplification signal with a ramp signal in the second control mode, so as to generate a second modulation trigger signal, wherein the second modulation trigger signal is configured to operably decide a time point where the inductor starts magnetizing; and a timing circuit, which is configured to operably count the second constant ON time triggered by the second modulation trigger signal in the second control mode, so as to decide a termination time point where the magnetizing of the inductor is to be terminated;

wherein in the first control mode, the portion of the sub-circuits of the second loop control circuit, of which power supplies being turned off include: the error amplification circuit, the second comparator and/or the timing circuit.

11. The switching converter as claimed in claim 1, wherein power consumption of the first loop control circuit is smaller than power consumption of the second loop control circuit.

12. A conversion control circuit, which is configured to operably control a switching converter, wherein the switching converter includes a power stage circuit, wherein the power stage circuit is configured to operably switch an inductor by at least one switch, so as to convert an input power to an output power; the conversion control circuit comprising:

a first loop control circuit, which is configured to operably control switching of the at least one switch by a peak current mode according to a first feedback signal related to the output power and an inductor current of the inductor in a first control mode, so as to regulate an electric characteristic at a predetermined level, wherein in the peak current mode, a peak of the inductor current corresponds to a peak current level; and a second loop control circuit, which is configured to operably control the at least one switch to switch with a switching period according to a second feedback signal related to the output power in a second control mode;

wherein when the power stage circuit operates in a discontinuous conduction mode (DCM) for consecutively more than a first predetermined number of switching periods, the switching converter enters the first control mode, wherein the DCM indicates that: within the switching period, the inductor current flowing through the inductor is reduced to zero until a starting time point of a next switching period, wherein in the first control mode, power supplies for a portion of sub-circuits of the second loop control circuit are turned off, so as to reduce power consumption;

wherein in the first control mode, during a second predetermined number of the switching periods, when a number of the switching periods in which the power stage circuit operates in the DCM is smaller than a third predetermined number, the switching converter enters the second control mode.

13. The conversion control circuit as claimed in claim 12, wherein in the first control mode, when a voltage difference between an input voltage of the input power and an output voltage of the output power is smaller than a predetermined difference, the switching converter enters a light-load constant ON mode, wherein in the light-load constant ON mode, the first loop control circuit is configured to operably control the at least one switch via a first constant ON time, such that a ripple of the output voltage is smaller than a predetermined ripple value and power conversion efficiency of the switching converter is greater than a predetermined efficiency value.

14. The conversion control circuit as claimed in claim 13, wherein when the input voltage is smaller than a reference voltage, the switching converter enters an extended conduction mode, wherein in the extended conduction mode, the first loop control circuit is configured to operably keep the at least one switch to be ON via an extended ON time until the output voltage is greater than the reference voltage and the voltage difference is greater than the reference voltage.

15. The conversion control circuit as claimed in claim 12, wherein the first loop control circuit includes:

a first comparator, which is configured to operably compare the first feedback signal with a first reference signal in the first control mode, so as to generate a first modulation trigger signal, wherein the first modulation trigger signal is configured to operably decide a time point where the inductor starts magnetizing;

a current signal generation circuit, which is configured to operably sense the inductor current, so as to generate a current sensing signal;

a current comparison circuit, which is configured to operably compare the current sensing signal with a peak reference signal in the first control mode to generate a comparison output signal, wherein when the comparison output signal indicates that the inductor current has reached peak current level, the first loop control circuit controls the at least one switch to switch the inductor to terminate the magnetizing of the inductor.

16. The conversion control circuit as claimed in claim 15, wherein in the first control mode, when the first feedback signal is smaller than the first reference signal, the switching converter starts to supply power to the current signal generation circuit and the current comparison circuit, such that the current signal generation circuit and the current comparison circuit are activated to operate, wherein after the switching converter has started to supply power to the current signal generation circuit and the current comparison circuit for a wakeup delay period, the first loop control circuit starts to trigger the inductor to start magnetizing and the first loop control circuit starts to detect the comparison output signal, so as to decide a termination time point where the magnetizing of the inductor is to be terminated.

17. The conversion control circuit as claimed in claim 12, wherein a current consumed by a first feedback circuit which is configured to operably generate the first feedback signal is smaller than a current consumed by a second feedback circuit which is configured to operably generate the second feedback signal, wherein in the first control mode, the second feedback circuit is an open circuit, such that the current consumed by the second feedback circuit is zero.

18. The conversion control circuit as claimed in claim 17, wherein the first feedback signal is a unit gain signal of an output voltage of the output power.

19. The conversion control circuit as claimed in claim 12, wherein the second loop control circuit includes:

an error amplification circuit, which is configured to operably amplify a difference between the second feedback signal and a second reference signal in the second control mode, so as to generate an error amplification signal;

a second comparator, which is configured to operably compare the error amplification signal with a ramp signal in the second control mode, so as to generate a second modulation trigger signal, wherein the second modulation trigger signal is configured to operably decide a time point where the inductor starts magnetizing; and a timing circuit, which is configured to operably count a second constant ON time triggered by the second modulation trigger signal in the second control mode, so as to decide a termination time point where the magnetizing of the inductor is to be terminated;

wherein in the first control mode, the portion of the sub-circuits of the second loop control circuit, of which power supplies being turned off include: the error amplification circuit, the second comparator and/or the timing circuit.

20. The conversion control circuit as claimed in claim 12, wherein power consumption of the first loop control circuit is smaller than power consumption of the second loop control circuit.

21. A conversion control method, which is configured to operably control a switching converter, wherein the switching converter includes a power stage circuit, wherein the power stage circuit is configured to operably switch an inductor by at least one switch, so as to convert an input power to an output power; the conversion control method comprising the following steps:

controlling switching of the at least one switch by a peak current mode according to a first feedback signal related to the output power and an inductor current of the inductor in a first control mode, so as to regulate an electric characteristic at a predetermined level, wherein in the peak current mode, a peak of the inductor current corresponds to a peak current level; and controlling the at least one switch to switch with a switching period according to a second feedback signal related to the output power in a second control mode;

wherein when the power stage circuit operates in a discontinuous conduction mode (DCM) for consecutively more than a first predetermined number of switching periods, the switching converter enters the first control mode, wherein the DCM indicates that: within the switching period, the inductor current flowing through the inductor is reduced to zero until a starting time point of a next switching period, wherein in the first control mode, power supplies for a portion of sub-circuits of a loop control circuit in the second control mode are turned off, so as to reduce power consumption;

wherein in the first control mode, during a second predetermined number of the switching periods, when a number of the switching periods in which the power stage circuit operates in the DCM is smaller than a third predetermined number, controlling the switching converter enters the second control mode.

22. The conversion control method as claimed in claim 21, wherein in the first control mode, when a voltage difference between an input voltage of the input power and an output voltage of the output power is smaller than a predetermined difference, controlling the switching converter to enter a light-load constant ON mode, and controlling the at least one switch via a first constant ON time, such that a ripple of the output voltage is smaller than a predetermined ripple value and power conversion efficiency of the switching converter is greater than a predetermined efficiency value.

23. The conversion control method as claimed in claim 22, wherein when the input voltage is smaller than a reference voltage, controlling the switching converter enters an extended conduction mode to keep the at least one switch to be ON via an extended ON time until the output voltage is greater than the reference voltage and the voltage difference is greater than the reference voltage.

24. The conversion control method as claimed in claim 21, further comprising the following steps:

comparing the first feedback signal with a first reference signal in the first control mode, so as to generate a first modulation trigger signal;

deciding a time point where the inductor starts magnetizing according to the first modulation trigger signal; and comparing a current sensing signal related to the inductor current with a peak reference signal in the first control mode to generate a comparison output signal, wherein when the comparison output signal indicates that the inductor current has reached peak current level, controlling the at least one switch to switch the inductor, so as to terminate the magnetizing of the inductor.

25. The conversion control method as claimed in claim 24, wherein in the first control mode, after the first feedback signal is smaller than the first reference signal for a wakeup delay period, starting to trigger the inductor to start magnetizing; and starting to detect the comparison output signal, so as to decide a termination time point where the magnetizing of the inductor is to be terminated.

26. The conversion control method as claimed in claim 21, further comprising the following steps:

amplifying a difference between the second feedback signal and a second reference signal in the second control mode, so as to generate an error amplification signal;

comparing the error amplification signal with a ramp signal in the second control mode, so as to generate a second modulation trigger signal for deciding a time point where the inductor starts magnetizing; and counting a second constant ON time triggered by the second modulation trigger signal in the second control mode, so as to decide a termination time point where the magnetizing of the inductor is to be terminated.

* * * * *